June 18, 1940.    C. C. SHUTT ET AL    2,205,224
STARTING CONTROL FOR SYNCHRONOUS MOTORS
Original Filed Feb. 23, 1935    6 Sheets-Sheet 1

WITNESSES:
C. J. Weller
Wm. C. Groome

INVENTORS
Charles C. Shutt and
John W. Dawson.
BY
Paul E. Friedemann
ATTORNEY

June 18, 1940.  C. C. SHUTT ET AL  2,205,224
STARTING CONTROL FOR SYNCHRONOUS MOTORS
Original Filed Feb. 23, 1935   6 Sheets-Sheet 2

WITNESSES:
C. J. Weller
Wm. C. Groome

INVENTORS
Charles C. Shutt and
John W. Dawson.
BY
Paul E. Friedemann
ATTORNEY

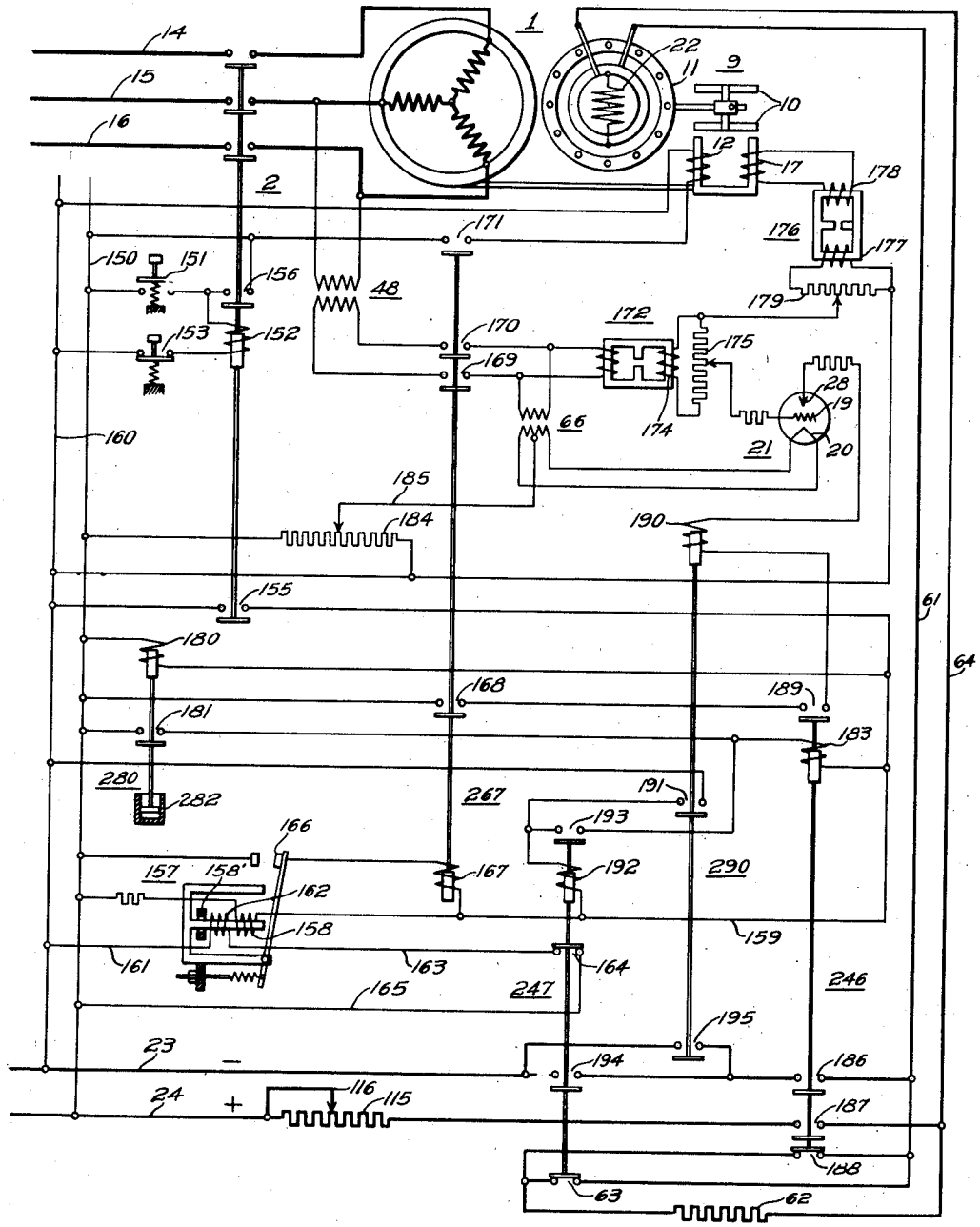

June 18, 1940.   C. C. SHUTT ET AL   2,205,224
STARTING CONTROL FOR SYNCHRONOUS MOTORS
Original Filed Feb. 23, 1935    6 Sheets-Sheet 5
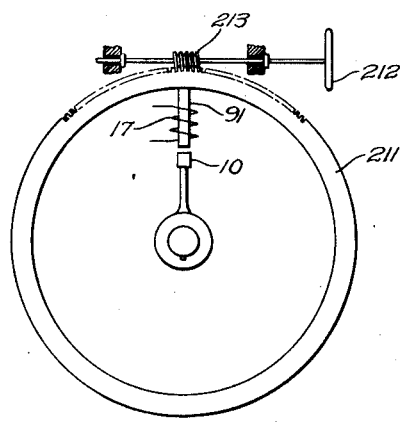
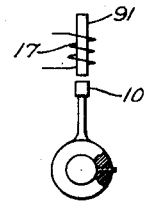
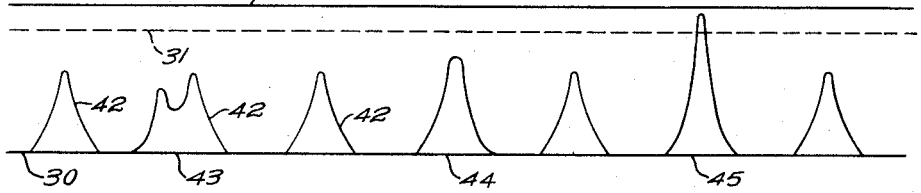
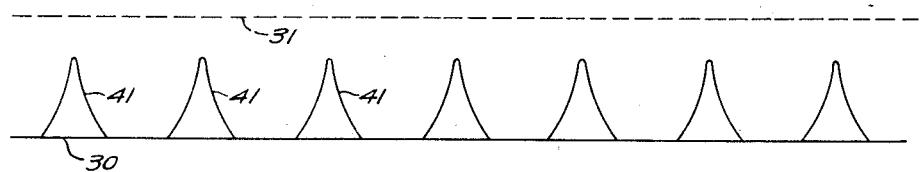
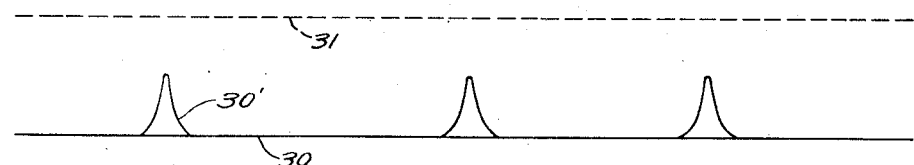
INVENTORS
Charles C. Shutt and
John W. Dawson.
BY
Paul E. Friedemann
ATTORNEY June 18, 1940.  C. C. SHUTT ET AL  2,205,224
STARTING CONTROL FOR SYNCHRONOUS MOTORS
Original Filed Feb. 23, 1935    6 Sheets-Sheet 6
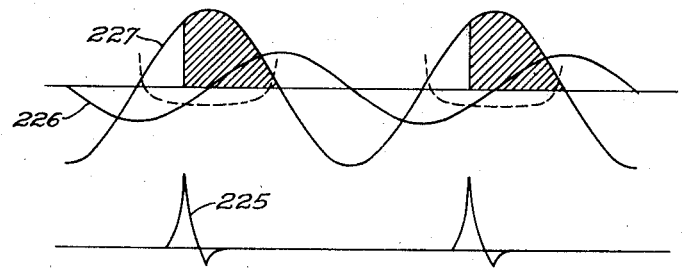
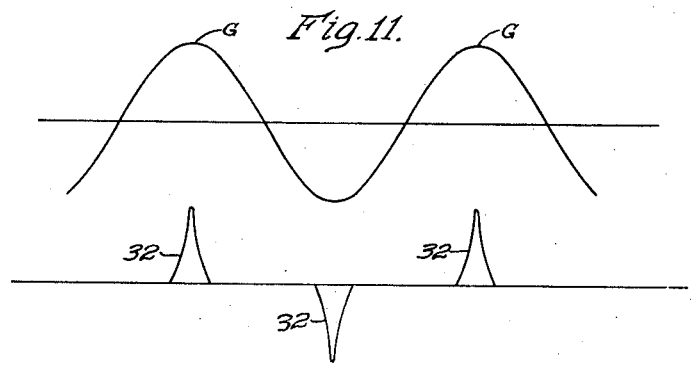
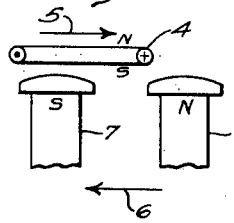 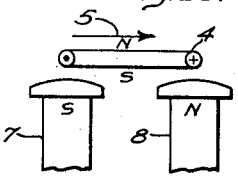 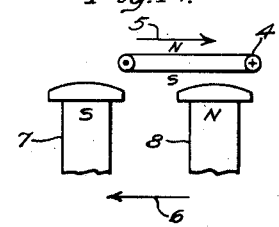
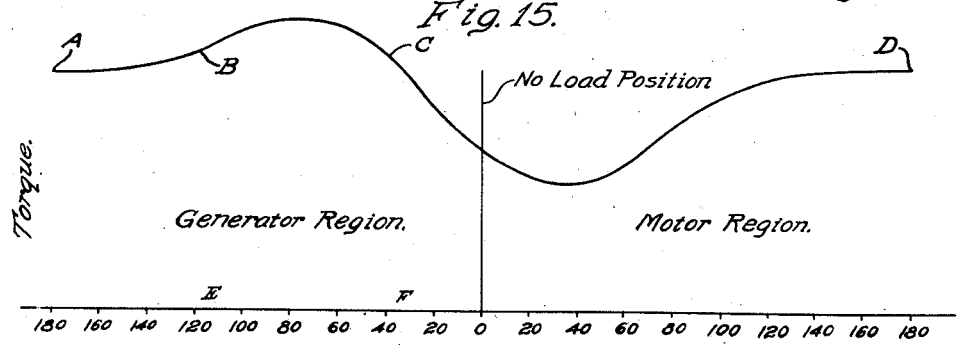
WITNESSES:
INVENTORS
Charles C. Shutt and
John W. Dawson.
BY
ATTORNEY Patented June 18, 1940

2,205,224

UNITED STATES PATENT OFFICE 2,205,224

STARTING CONTROL FOR SYNCHRONOUS MOTORS

Charles C. Shutt, East McKeesport, and John W. Dawson, Wilkinsburg, Pa., assignors to Westinghouse Electric & Manufacturing Company, East Pittsburgh, Pa., a corporation of Pennsylvania Application February 23, 1935, Serial No. 7,710

17 Claims. (Cl. 172—289)

Our invention relates to a system of control for electric motors and relates more particularly to a system of control for automatically starting synchronous motors.

It is well known and usual practice to start synchronous motors as induction motors and, to transfer the motors from induction motor operation to synchronous motor operation, various automatic control systems are known to the trade and to those skilled in the art. With all of such automatic starting control systems no provision is made to eliminate the undesirable surges occasioned or produced on the supply circuit during such transfer from induction motor operation to synchronous motor operation. Furthermore, such transition from induction motor operation to synchronous motor operation not only produces surges on the supply system but also mechanical shocks to the motor, to the load coupled to the motor and to the generator of the supply system. A still more undesirable feature of operation of existing devices is that the motor may fail to synchronize because the pull-in torque that is developed by the motor when the excitation is applied at any particular instant may be less than the torque required by the load, with the result that the motor fails to synchronize even though the normal torque required by the load is less than the maximum torque against which the motor will synchronize if the proper instant is selected for the application of the excitation. When the field is excited the surges and shocks are repeated continually until the load is removed or synchronization takes place. It is thus apparent that under such conditions the motor could normally drive the load if at the moment transfer is attempted its torque capacity could be increased to effect synchronization.

It is well known to those versed in the art, that the maximum load which a given synchronous motor can accelerate from the balancing speed on its starting windings and synchronize varies with the relation in space of the rotor, or member which carries the field windings, with respect to the rotating vectors which represent the polyphase voltages impressed on the stator or armature windings, at the time of application of the direct current excitation voltage to the field windings.

One object of our invention is to provide for controlling the time of application of the excitation voltage to the field windings of a synchronous motor.

Another object of our invention is to provide for selecting any pull-in torque between the minimum and the maximum of any given synchronous motor.

A more specific object of our invention is to control the time of energization of the field winding of a synchronous motor with reference to any given point on an alternating current voltage wave supplied to the armature or stator of the motor.

Another object of our invention is to control the time of transfer of a synchronous motor from induction motor operation to synchronous motor operation so that the maximum load which the motor can accelerate consistently from the balancing speed on its starting windings and bring into synchronism is increased compared to the maximum load which the motor can accelerate consistently and sychronize without such control of the time of energization of the field winding.

A still further object of our invention is to minimize, or decrease, the transient pulsations of torque and current which always accompany, to a greater or less extent, the synchronizing of a synchronous motor.

Another object of our invention is to transfer a synchronous motor from induction motor operation to synchronous motor operation at such a time to secure maximum pull-in torque.

It is also an object of our invention to provide for starting a synchronous motor by effecting transfer from induction motor operation to synchronous motor operation a selected or predetermined time interval after the motor is energized and at a selected instant of time to provide any selected pull-in torque of the motor between the minimum and the maximum of the particular motor being started.

A somewhat more specific object of our invention is to provide for starting a synchronous motor by effecting transfer from induction motor operation to synchronous motor operation at a selected or predetermined time interval after the motor is energized and at an instant of time when the field windings of the motor are in a given position with reference to a selected point on a voltage wave of the alternating current supplied to the motor.

Another object of our invention is to control the time of transfer of a synchronous motor from induction motor operation to synchronous motor operation at a selected time interval after energization of the motor and in such manner that the maximum load which the motor can accelerate consistently from the balancing speed attained in the selected time interval on its starting windings and bring into synchronism is increased compared to the maximum load which the motor can accelerate consistently and synchronize without such control of the time of transfer or energization of the field windings.

A still further object of our invention is to minimize, or decrease, the transient pulsations of torque and current which always accompany, to a greater or less extent the synchronization of a synchronous motor during transfer from induction motor operation to synchronous motor operation effected at a selected time interval after the motor is energized.

It is also an object of our invention to accelerate a synchronous motor for a predetermined interval of time and thereafter transfer the motor from induction motor operation to synchronous motor operation at such an instant of time to secure a relatively large or substantially maximum pull-in torque.

It is also an object of our invention to provide means for automatically accelerating a synchronous motor for a predetermined interval of time as an induction motor and thereafter to automatically change to synchronous motor operation at a selected time to secure a relatively large, or substantially maximum pull-in torque.

Other objects and advantages will become more apparent from a study of the following specification and the claims appended thereto when considered, or studied, in conjunction with the accompanying drawings, in which:

Figs. 3 and 4 are diagrammatic showings of still other modifications of our invention in combination with automatic time limit starting control systems;

Fig. 5 is a somewhat diagrammatic showing of the means for adjusting the circumferential position of the electromagnets of the impulse generator constituting a part of our invention;

Fig. 6 is a somewhat diagrammatic showing of means for adjusting the position relative to the shaft of the main motor of an armature element of an impulse generator;

Figs. 7, 8 and 9 show graphically how the grid potential of the field control electronic discharge device is caused to rise to within the range of the critical grid potential or breakdown voltage of the said discharge device;

Fig. 10 shows wave diagrams which illustrate the function of an electronic discharge device actuated from alternating current;

Fig. 11 shows wave diagrams of the source of energy and the characteristics of energy transmitted by a surge transformer constituting part of our invention;

Figs. 12, 13 and 14 illustrate diagrammatically sections of a stator core with reference to the poles of the field winding, and represent, respectively, Generator region, No-load position and Motor region; and, Fig. 15 shows the variations of starting torque for different angular positions of the rotor with reference to the impressed voltage.

Generally stated, our invention embodies an automatic system of control for controlling the complete synchronization of a synchronous motor and the specific features thereof may thus be utilized with a time limit starting control, a field frequency control, a speed responsive control, or a scheme for automatically selecting both the speed or slip frequency and select a definite relation of the rotor and the rotating field at the moment of transfer to secure desired pull-in torque characteristics.

In this application, we, more specifically, disclose and claim the combination of time limit starting control and "angle switching" control. The combination of speed or slip frequency responsive starting control and "angle switching" control, is being disclosed in another of our copending applications entitled "Starting control for synchronous motors", filed January 31, 1935, Serial No. 4,323, and the scheme for automatically selecting both the speed or slip frequency and a selected relation of rotor and rotating field to secure desired pull-in torque characteristics is disclosed and claimed in a still other of our copending applications entitled "Starting control for synchronous motors", filed January 31, 1935, Serial No. 4,322.

Figure 1:
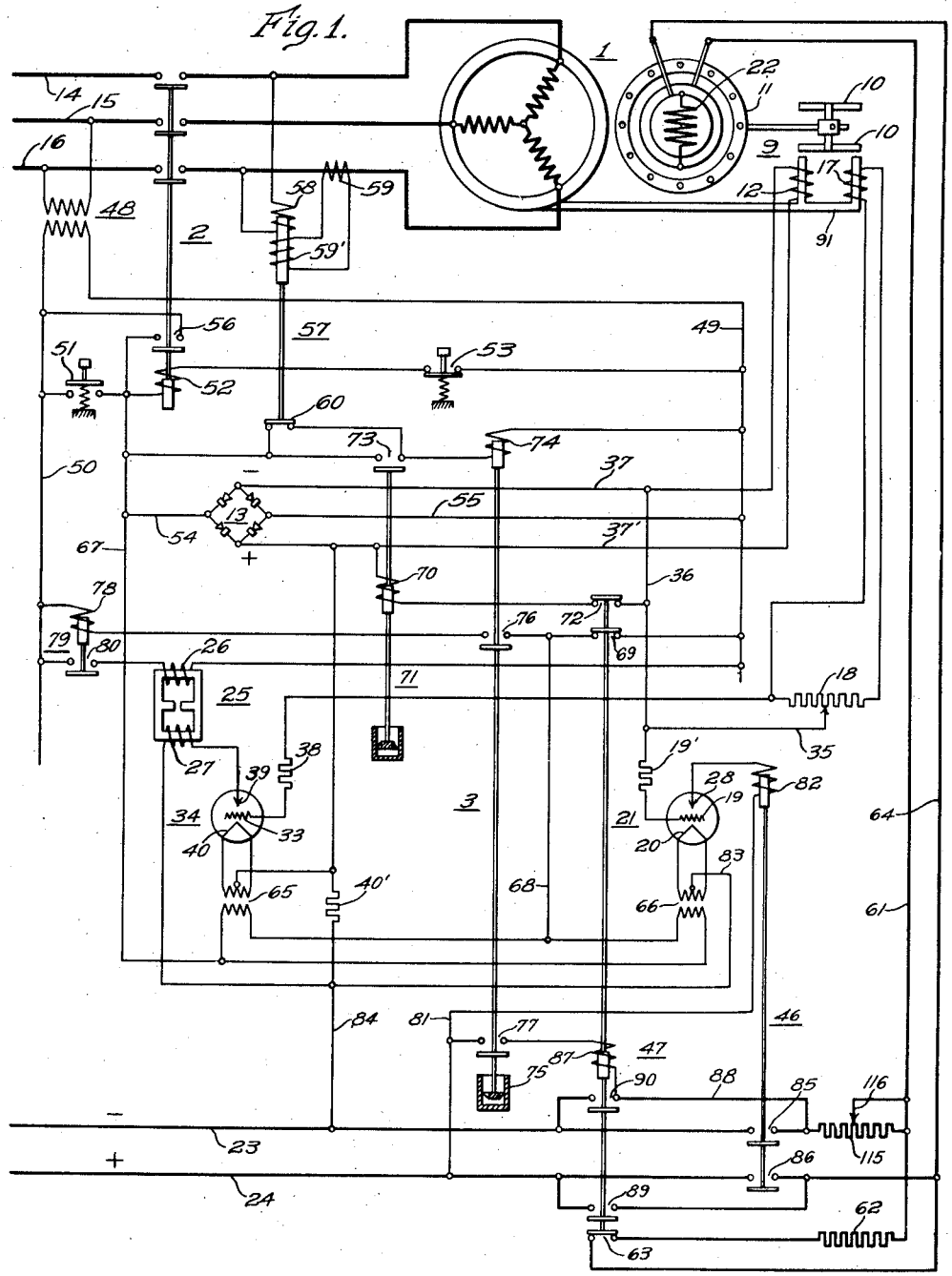
Figure 1 is a diagrammatic showing of an automatic time limit starting control system in combination with mechanical means, electronic means, electromagnetic means and other means illustrating the novel features of our invention.

If it be assumed, as shown in Fig. 1, that a time limit starting control system is used, then the synchronous motor 1 will start to accelerate as an induction motor the moment the main contactor or switch 2 is closed. A suitable time-limit device, as 3, is energized at the same time that the motor is connected to the source of energy by the switch 2.

The time-limit device may be a small synchronous motor operating suitable switches, a clock mechanism, an inductive time-limit relay or relays, a relay provided with a dashpot, or any other timing device. The time limit device is so adjusted for the given motor and the load coupled thereto that the motor will accelerate as an induction motor to its balancing speed, namely nearly stable induction motor speed, before any of its switches are operated.

After the lapse of the appropriate time interval determined by the time limit device, the control devices for energizing the field windings at the proper time are so energized as to produce the desired effect.

To produce the most desirable synchronization of the motor, the field windings should become fully energized at a time having a definite relation to the alternating current waves of the current supplied to the stator. Ordinarily the most desirable time will be at maximum pull-in torque.

In Fig. 15 the variations in torque are shown for different rotor positions with reference to the rotating field, measured in electrical degrees. Zero represents the position of the rotor when the motor is in synchronism at the particular instant and carrying no load. The portion marked Generator region corresponds to rotor positions in space ahead, in the direction of rotation, of the no load synchronous position at any particular instant that may be considered. The portion designated Motor region corresponds to rotor positions behind the no load synchronous position at any particular instant that may be considered.

In addition, the motor, for the torque values included in the most favorable portion of the Generator region, such as the ordinates of the section of the curve BC, will normally be synchronized while the rotor moves in space through not more than one pole pitch. This is the ideal region for synchronizing because the pull-in torque is high and as a result the torque and current pulsations will be a minimum.

For other switching angles to the right of F and to the left of E, the torque values as given by the curve portions AB and CD represent load torques against which the motor will ultimately synchronize, but only after the rotor slips one or more poles. For torques less than those represented by the ordinates of the torque portions AB and CD, the number of poles which the rotor must slip decreases. In general, the motor will synchronize without slipping poles from any switching angle, even in the unfavorable regions, provided that the load torque is sufficiently reduced. By the use of our contribution to the art, the field windings may be fully excited at any point between A and D but to secure the full advantages of such selective control, the field will be caused to become fully excited while the rotors are in the favorable region, namely the angles between F and E.

The curve shown in Fig. 15 was determined from test data of a typical synchronous motor. For a given voltage and frequency supplied to a motor, the curve will of course, vary (1) with a change of the mechanical inertia of the moving elements, (2) a change in the excitation current of the field windings, (3) a change in the field winding circuit time constant, and (4) the total time consumed by the relays that are caused to operate at the time of transfer.

To amplify the explanation given in connection with Fig. 15, attention is called to Figs. 11, 12, 13 and 14. Let the upper portion of Fig. 11 represent the voltage impressed across the particular phase of the stator winding plotted against time. Let the check for rotor position, by the devices described more in detail hereinafter, be made at each of the points marked G. Let the reference character 4 in Figs. 12, 13 and 14 represent one of the coils in the phase across which the voltage shown in the upper portion of Fig. 11 is impressed. In Figs. 12, 13 and 14 sections of this coil are shown in the Generator region, No-load position and Motor region, respectively.

Let the arrows designated by the reference character 5 represent the direction of rotation of the rotating field and let the polarities at the particular instant be as indicated adjacent the coil. Let the direction of slip be indicated by the arrows 6. Then if the poles 7 and 8 are energized with direct current and have the polarities shown, it will be apparent that the motor will fall into synchronism with a substantially maximum torque for the position shown in Fig. 12, which will be the most desirable operation. That is, in Fig. 12 the rotor is in the most favorable Generator region.

In Fig. 13, the motor will be in no-load synchronous position and may, if the factors mentioned that influence synchronization are of the proper value, pull into synchronism without slipping poles. For the position shown in Fig. 14, the chances are against smooth synchronization. With our devices the field windings are fully excited when the rotor has the position shown in Fig. 12.

One of the essential features of our invention is, therefore, to determine the rotor position with reference to a given point as G in Fig. 11 on the wave of alternating-current supplied to the stator. Our devices, after a suitable impulse has been received from the devices or system of control indicating a proper speed and rotor position relative the rotating field, will apply the excitation voltage to the field windings at the first instant the relation of the rotor to the rotating field is correct for maximum pull-in torque, or any other torque that may be selected.

One set of means for determining the rotor position is shown at 9 in Fig. 1 and consists of one or a plurality of metal strips 10 of high permeability disposed axially of the rotor 11 of the motor 1. These bars are coupled to the rotor shaft to rotate with the rotor. Each bar or metal strip is located on the center line of one of the poles of the rotor, or any other position may be selected. When a plurality of strips are used there may be as many as one strip for every other pole around the rotor. The positions may not be on the center lines of the poles, but it is essential that the strips have some known positional relation to the pole pieces.

Fig. 5 shows the motor shaft provided with the bar 10 shown in fixed relation to the shaft. A suitable carriage 211 carrying the electromagnet 91 and coils 12 and 17, is mounted to be adjustable circumferentially of the shaft by the hand-wheel 212. By operating the hand-wheel driving the worm 213, the carriage and the electromagnets may be made to take any position with reference to the stator of the motor.

In Fig. 6, the electromagnet 91 is shown relatively fixed, but in this instance the bar 10 is shown to be adjustable relative the motor shaft. The motor may be provided with one or both the adjusting means shown in Figs. 5 and 6.

The strip or strips 10 pass under the poles of an electromagnet 91 which has a winding 12 excited with direct current from a suitable source of direct current, as from the direct-current terminals of a double-wave rectifier 13 adapted to be energized with alternating current from two of the main buses 14, 15 and 16 upon the closure of the line contactor 2.

As the strip or strips 10 pass the poles of the electromagnet, bridging the poles, a voltage impulse is induced in the winding 17. This voltage impulse is impressed upon the resistor 18.

The current surges in the resistor 18 cause a variation of potential of the grid 19 with reference to the cathode 20 of the electronic device 21. The impulses produced by the coil 17, acting alone, are not of sufficient magnitude to make the electronic device 21 conducting, that is, are not of sufficient effect to cause the electronic tube 21 to break down or discharge. Furthermore, no particular novel result would be secured if tube 21 should break down each time a voltage impulse were induced in coil 17, but the action of tube 21 would then only be to measure the slip frequency of the motor, or, what is more accurate, the impulses and in consequence the break down of tube 21 would be a measure of the speed of the motor.

To properly control the time of energization of the field winding 22 from the direct current buses 23 and 24 the breakdown of tube 21 is made a function of the combined action of the voltage impulse of coil 17 and the break-down of discharge device 34 occasioned or caused by the voltage impulse of an impulse transformer 25.

The impulse transformer 25 has a primary winding 26 which is connected to be energized with alternating current, as illustrated in the upper portion of Fig. 11. The magnetic circuit of the impulse transformer is so designed that the voltage impulses 32 at the secondary winding are, as to position and magnitude, somewhat as shown in the lower portion of Fig. 11.

The grid 33 of the electronic device or tube 34 is connected through a resistor 38 to the left-hand junction of the resistor 18 and through a portion of the resistor 18 and conductors 35 and 36 is connected to the conductor 37 coupled to the negative terminal of rectifier 13 and thus receives a certain negative bias with reference to the anode 39. The relation of the voltages of the cathode 40, grid 33 and anode 39 is so chosen that at the first coincident effect of the voltage impulse from the secondary winding 27 of impulse transformer 25 and the impulse of coil 17 the tube 34 becomes conducting, or breaks down producing a unidirectional current impulse. The instant tube 34 breaks down the grid bias on tube 21 is changed so that tube 21 breaks down.

In Figs. 7, 8 and 9 curve 29 represents the anode potential of tube 21 whereas the curve 31 shown in dotted line shows the critical potential of tube 21. Each time a positive impulse, as indicated by curve 41, is received from the secondary 27 and a coincident impulse, as indicated by curve 30', is received from coil 17 tube 34 breaks down and passes current. Since the potential on grid 19 is varied by the break down of tube 34, tube 21 will also break down when tube 34 breaks down.

The design is such that the variations in grid bias occasioned by coil 17 alone are below the critical voltage of tube 34. Fig. 9 shows the variations in grid bias produced by the impulses of coil 17. These latter impulses are determined by the speed of the motor and since the motor at the balancing speed is still slipping with reference to the rotating field, the total effect on the grid 33 will be as indicated by the curve 42 in Fig. 7. At the region 43, the curve 42 will be distorted, at region 44 there is less distortion and greater amplitude, and at 45 the amplitude is sufficient in magnitude to intersect the critical potential for tube 34.

Region 45 represents that region when the rotor of the motor is in the desired position with reference to a given point on a wave of alternating current traversing the stator and producing the rotating field. The electromagnet 91 is designed to be adjustable circumferentially of the motor shaft so that any time of operation may be selected for the tube 34 with reference to the load torque curve shown in Fig. 15. The most desirable position of the electromagnet 91 is, of course, such that the field 22 becomes fully excited when the field pieces or poles are in the Generator region.

When the tube 21 becomes conducting, the high speed field switch 46 is caused to operate and the main field switch 47 is also caused to operate a short time after the operation of switch 46. The field 22 becomes energized and the motor is synchronized with maximum pull-in torque.

Fig. 10 illustrates how the impulses 225 of the impulse transformer 25 act with reference to the voltage variations in the discharge device 34 to cause that device to break down at any point on the alternating current cycles shown.

Fig. 10 illustrates a typical method of effecting discharge of an electric discharge device by shifting the angle of the grid potential curve 226 with reference to the anode potential curve 227 for an electric discharge device connected to a source of alternating current. It will be apparent from an inspection of Figs. 1, 2 and 3 that the electric discharge device 34 is subjected to alternating current, whereas the electric discharge device 21, except for the variations in grid potential, is subjected to direct current potential. Figs. 7, 8 and 9, inclusive, illustrate how the electric discharge device 21 may break down or become conducting.

A better understanding can probably be had from a study of a detailed description of the sequence of operation of our invention for a typical starting and operating cycle of a synchronous motor.

If the motor 1 is to be started, the starting switch or push button 51 is depressed, thereby establishing an energizing circuit for the actuating coil 52 of the main contactor 2 between the energized conductors 50 and 49. These conductors are energized from the transformer 48 coupled to the main energized buses 15 and 16. The circuit may be traced from conductor 50 through switch 51, actuating coil 52 and stop switch 53 to the conductor 49. Operation of the main conductor or switch 2 establishes a holding circuit for itself through the contact members 56.

Operation of the starting switch 51 and the subsequent closing of the contact members 56 both effect the energization of conductor 67 which therefore establishes an energizing circuit for the full wave rectifier 13 from conductor 67 through conductor 54, the alternating current terminals of the rectifier 13, and conductor 55 to the energized conductor 49.

Energization of the rectifier 13 energizes conductors 37 and 37' with a direct current potential and in consequence the direct current coil 12 of the electromagnet 91 is energized. This direct current coil 12 is so designed that the electromagnet 91 will tend to be fully saturated while in operation.

The operation of the line contactor 2 also connects the motor 1 to the buses 14, 15 and 16 and in consequence the armature is energized, the motor starts, and alternating current is induced in the field windings 22. The currents induced in the field windings 22 traverse the conductor 61 through the discharge resistor 62, pass through the contact members 63 of the field contactor 47 and through conductor 64, back to the field winding 22. Immediately after the motor is energized the power factor relay 57 is energized. The power factor during starting will be quite lagging. The energization thus takes place through the voltage coil 58 and the current coil 59' energized by the current transformer 59. The operation of the power factor relay opens the contact members 60 thereby transferring the control of the time limit relay 3 to the time limit relay 71.

A pair of electric discharge devices 21 and 34 are utilized in our control system and to be certain that the cathodes, namely, the hot elements are properly heated when the motor 1 has attained the balancing speed, namely, the normal induction motor speed, the cathodes 20 and 40 are suitably energized by the transformers 65 and 66 interconnected with conductors 67 and 49, this interconnection being from conductor 67, the transformers 65 and 66, conductor 68, back contact member 69 of the main field switch 47, to the conductor 49.

The energization of the conductors 37 and 37' establishes an energizing circuit from conductor 37' through the actuating coil 70 of the time limit relay 71, back contact member 72 of the main field switch 47 and conductor 36 to the energized conductor 37. The time limit relay 71 is designed to have a negligible time constant when the actuating coil 70 is energized and in consequence, the contact members 73 immediately close after the energization of the actuating coil 70. It will thus be apparent that the actuating coil 74 of the time limit device 3 may be energized from the conductors 67 to 49 despite the fact that the contact members 60 of the power factor relay 67 are at this stage open.

The time limit relay 3, which relay may be a motor or any other timing device, is adjusted to have a time delay action, when the actuating coil 74 is energized, such that an appreciable interval of time elapses before the contact members 76 and 77 are closed. In the particular showing made in Fig. 1, the relay 3 is provided with a dashpot 75 to provide the time delay action. Normally the time constant of the time limit device or relay 3 is so selected that the motor will have attained its full balancing speed that is, a nearly stable speed before the contact members 76 are closed.

When, after the lapse of a certain time, the contact members 76 close an energizing circuit is established for the actuating coil 78 of the control relay 79 through the contact members 76 and the contact members 69.

Operation of the control relay 79 closes the contact members 80, thereby energizing the primary winding 26 of the impulse transformer 25. The secondary 27 of the impulse transformer 25 has one terminal connected to the anode 39 of the electric discharge device 34 and the other terminal connected to the cathode 40 through the resistor 40'. This other terminal of the transformer is also interconnected with the negative bus 23 of the direct current buses 23 and 24, which normally supply direct current excitation to the field windings 22.

The electromagnetic device 9 consists of one or more magnetic members or bars 10 disposed to rotate with the rotor of the motor and to pass the two poles of the electromagnet 91. It will thus be apparent that at each passing a voltage impulse will be generated in the winding 17 which voltage impulse will be impressed across the resistor 18. The voltage impulses shown by the curve 30' in Fig. 9 illustrate how these impulses vary in frequency with changes of the speed of the motor.

The grid 33 of the discharge device 34 is connected to the left-hand junction of the resistor 18 through the resistor 38 and by means of the adjustable conductor 35 and the conductor 36 is connected to the negative conductor 37. A certain negative bias will therefore be impressed on the grid 33, but the arrangement of the various electrical constants of the devices associated with the electronic or discharge device 34 are such that this discharge device will become conducting each time an impulse is produced in the secondary winding 27 that is coincident with an impulse from coil 17.

The grid 19 of the electric discharge device 21 is coupled to the adjustable conductor 35 through the resistor 19'. By an appropriate selection of the electrical constants associated with the electric discharge device 21 and by an appropriate adjustment of the conductor 35 the bias on the grid 19 may be changed a sufficient amount for effecting a discharge or breakdown of the electric discharge device 21 at the very first instant when the impulse of the coil 17 and the impulse caused by the breakdown of the electric discharge device 34 act in unison. This is clearly illustrated in Figs. 7, 8 and 9. The curve 29 designates the anode voltage of the discharge device 21 whereas the dotted curve 31 shows the critical voltage of this discharge device.

Since the variations of grid bias effected by the discharge device 34 are determined by the coincident effects of transformer 25 and coil 17 and since the voltage impulses of coil 17 shown by the curve 30' in Fig. 9 with reference to the cathode voltage curve 30 vary in frequency, the total variation in grid potential is as shown by curve 42. At region 43 the two voltage impulses are not yet sufficient to intersect the critical potential curve 31. At region 44 the relation is somewhat better, but still not sufficient to cause a breakdown of the discharge device 34. At region 45 the voltage impulses are at that instant in synchronism and the total voltage impulse intersects the critical potential curve 31 to cause a breakdown of the discharge device 34. Discharge device 21 is thus caused to break down by the break down of discharge device 34.

It will, of course, be apparent that the region 45 represents the relation between the rotor position and a given point on an alternating current voltage wave supplied to the stator and by the operation of tube 21 and the switch 46 selects a certain desired pull-in torque for the motor, taking into account, of course, the time constants of the high speed switch or relay 46 and the building up of the excitation in the field winding 22.

When the discharge device 21 has become conducting, a circuit is established from a positive bus 24 through conductor 81, actuating coil 82, of the high speed relay 46, anode 28 and cathode 20 of the electric discharge device 21 and conductors 83 and 84 to the negative bus 23. Operation of the high speed relay 46 closes the contact members 85 and 86 thereby connecting the field winding 22 to the direct current buses 23 and 24 through the contact members 85 and 86 and the control rheostat 115 having the adjustable member 116.

Operation of the high speed relay or switch 46 establishes another circuit from the positive bus 24 through conductor 81, contact members 77 of the time limit device 3, actuating coil 87 of the main field switch 47, conductor 88 and contact members 85 of switch 46 to the negative bus 23. Operation of the main field switch 47 closes the contact members 89 and 90 thereof to thus energize the field winding 22 independently of the high speed relay 46.

This high speed relay 46 is of a small current carrying capacity, but is nevertheless of sufficient size to carry the necessary current during the short interval of time that the transfer is made. A further advantage of utilizing a high speed relay as 46 other than decreasing the time between the breakdown of the discharge device 21 and the full energization of field winding 22 is the fact that the discharge resistor remains in the field circuit, even though the field is energized by a direct current, until the main field switch operates to open the contact members 63. Contact members 63 open after the closing of contact members 89 and 90, and, on reverse operation of switch 47 close before contact members 89 and 90 open.

After the operation of the main field switch 47, our special control, including the electric discharge devices, need no longer be energized. To disconnect these devices from the conductors 50 and 49, back contact members 69 on the main field switch 47 are utilized to open the circuit. Since the operation of the field switch also opens the circuit for the actuating coil 70 of the time limit relay 71, this time limit relay starts its operation and after some predetermined interval of time, which time will be sufficient in length to insure that the motor has pulled into step, will open the. contact members 73. Since the motor will have pulled in step by the time the contact members 73 are open, the contact members 80 will be closed, thus placing the energization of the actuating coil 74 of the time limit relay 3 under the control of the power factor relay 87.

This shifting of control from the time limit relay to the power factor relay is of special utility in connection with re-synchronization. If the motor should pull out of step by reason of an increase of load or any other reason, the power factor relay will open the contact members 80 thereby deenergizing the actuating coil 74 of the device 3 which will then in turn open the field circuit at the contact members 89 and 90 of switch 47 and re-establish an energizing circuit for the actuating coil 70 for the time limit device 71, which will thereupon initiate another starting cycle and re-synchronize the motor in exactly the manner it was synchronized in the first instance.

Figure 2:
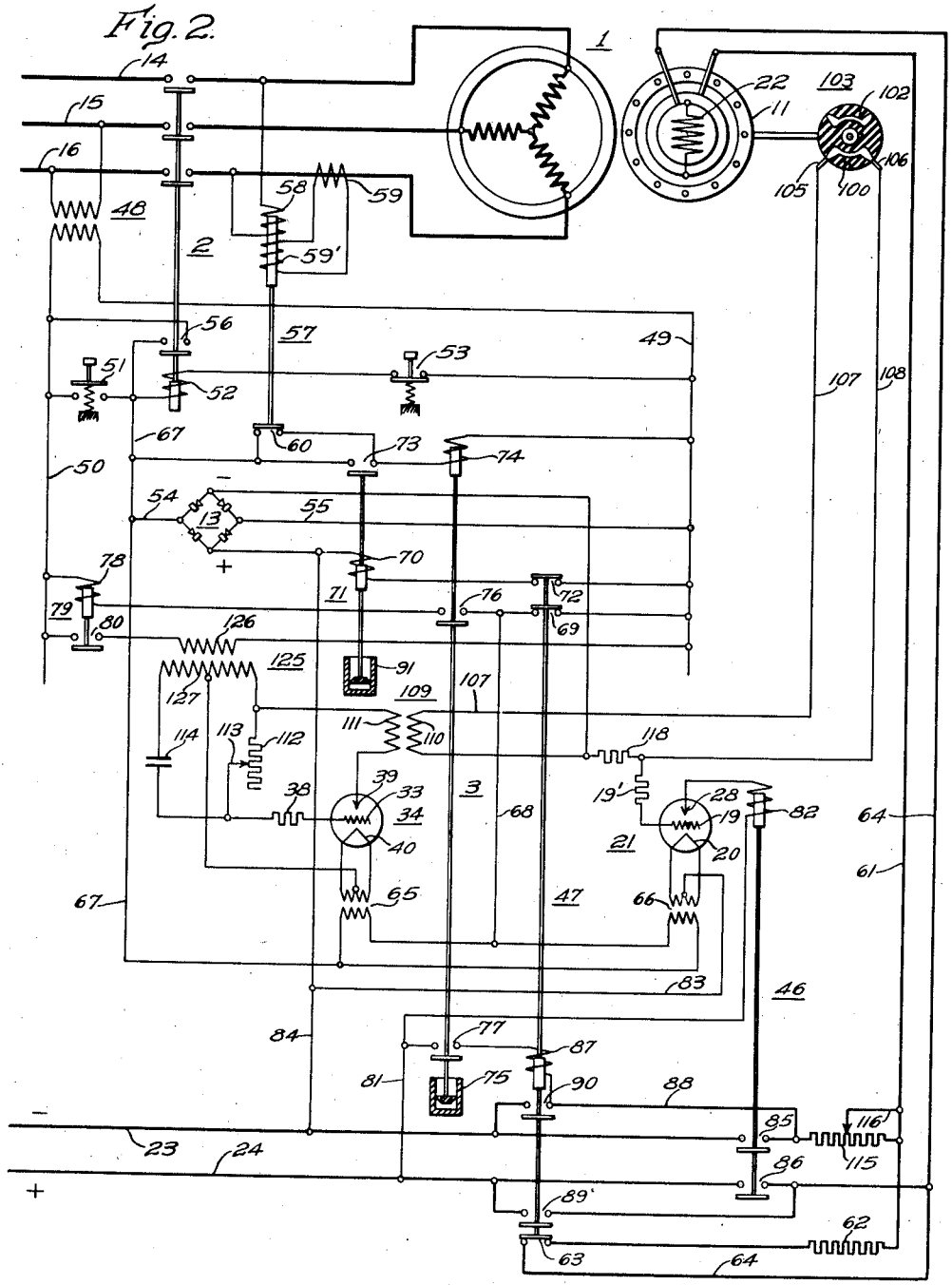
Fig. 2 is a digarammatic showing of a modification of an automatic time limit starting control system in combination with electronic means, electromagnetic means, mechanical means, and other means, illustrating the novel features of our invention.

The modification shown in Fig. 2 is somewhat similar to the embodiment shown in Fig. 1. However, in this modification, no voltage impulse is generated by a device such as is shown at 9 in Fig. 1 and 103 in Fig. 2, but a transformer 125 having the primary winding 126 and the secondary winding 127 is connected to energize a transformer 109 having the primary 111 and secondary 110. The secondary of transformer 109 is connected to the conductors 107 and 108 and the brushes 105 and 106. It is thus apparent that each time a voltage impulse is induced in the secondary winding 110 current will flow through conductor 107, brush 105, conducting elements 100, brush 106, conductor 108 and resistor 118. Current will also flow through the primary winding of transformer 110 if the insulating disc 103 is in the position shown in Fig. 2 or in such a position as to present the conducting element 102 to the brushes 105 and 106. Brushes 105 and 106 may be made adjustable circumferentially of the rotor axis and any point may be selected to effect breakdown of the electric discharge device 34 as suggested by Figs. 5 and 6.

The midpoint of the secondary 127 is connected to the cathode 40 and the grid 33 is connected to the phase shifting devices 112, 113 and 114 through the resistor 38. It is thus apparent that the discharge device 34 may be made to become conducting at any point of the alternating current impulses induced in the secondary winding 127 and which conducting current will energize the primary 111 of the transformer 109. The secondary winding 110 will thus be subjected to voltage impulses, the frequency of which will be equal to the line frequency. However, as long as the rotor of the motor is not in a given position with reference to a certain point on an alternating current wave, the conducting strips 103 will not be in proper or conducting position and in consequence the grid bias of the tube 21 will not be changed sufficiently to cause breakdown of the discharge device 21. However, breakdown will occur when such desirable position of the rotor is obtained. Furthermore, the discharge device will become conducting, the very first time that the rotor is in the desired position after the closing of the contact members 80 of the control relay 79. When the discharge device 21 breaks down, the transfer is effected as disclosed in the embodiment of Fig. 1.

Figure 3:
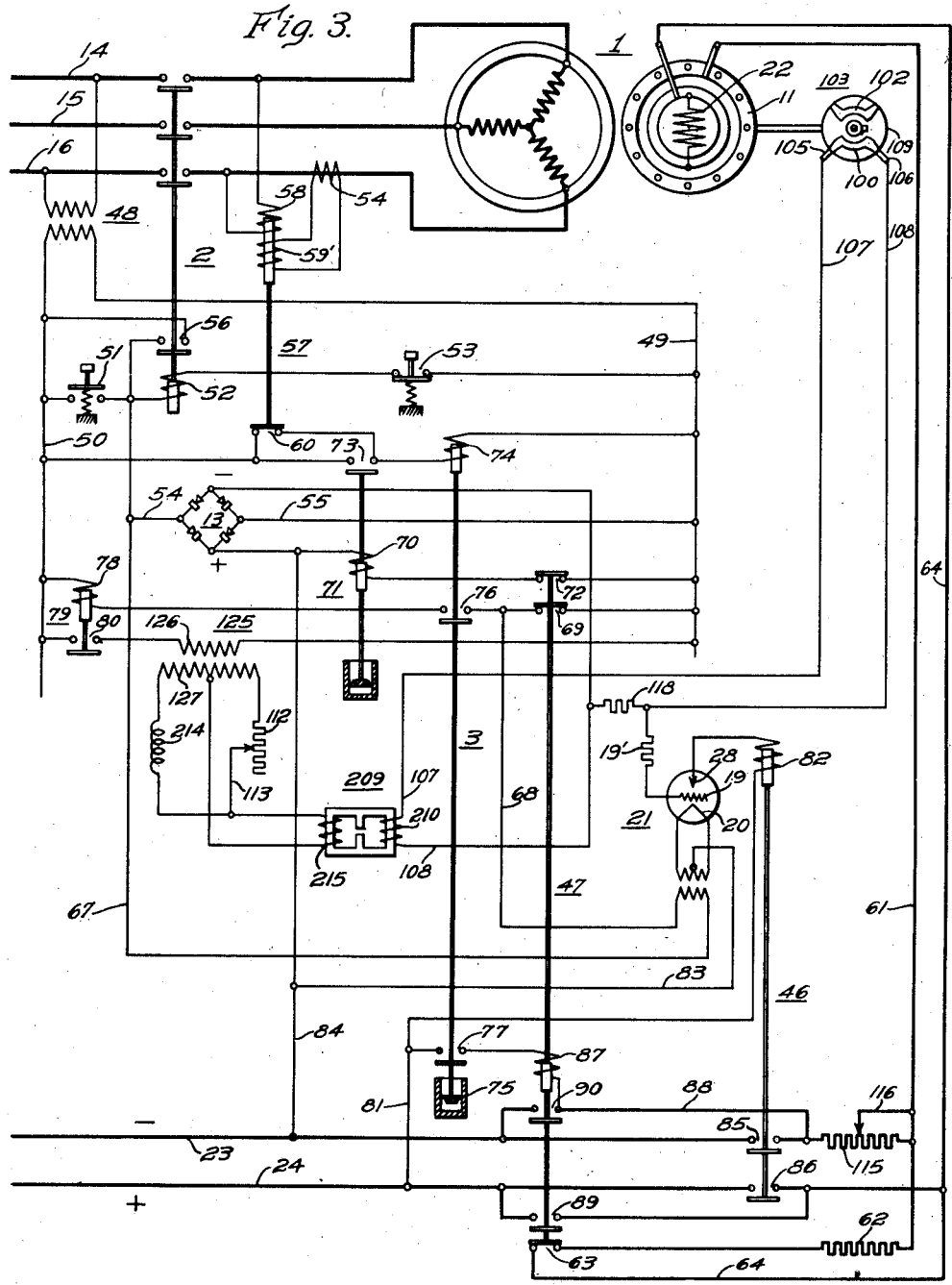

Fig. 3 is very similar to the modification shown in Fig. 2 except that instead of utilizing a transformer as 109 which will of course be energized for the entire time that the discharge device 10 34 is conducting, an impulse transformer 209 is utilized which impulse transformer eliminates the need of a discharge device 34 entirely. When potential impulses are induced in the primary winding 215, very sharp impulses are induced in the secondary winding 210, which impulses are sufficient in magnitude when the brushes 105 and 106 and either one of the conducting segments 102 and 103 are in the proper or conducting position to cause a breakdown of the discharge device 21 to thus effect the desired transfer of the motor from induction motor operation to synchronous motor operation and to effect such transfer at the time selected. The characteristic of the impulses is determined by the resistor 112 and reactance 214.

The modification shown in Fig. 4, similar to the showing in Fig. 3, utilizes but a single electronic discharge device as 21, but the system of control as a whole is considerably different than the modification shown in Fig. 3. To understand the novel features of this modification, a detailed explanation of the cycle of operation may be desirable. If the attendant wishes to start the synchronous motor 1, he depresses the starting switch 151 thereby establishing a circuit from conductor 150 through switch 151, actuating coil 152 of line switch 2 and stop switch 153 to the energized conductor 160. Conductors 150 and 160 are connected directly to the direct current buses 23 and 24. Operation of the main line switch 2 establishes its own holding circuit through contact member 156 and energizes the motor 1 and this motor begins to operate as an induction motor and in so doing induces an alternating current in the winding 22 which current is discharged through the conductors 61 and 64, the contact members 63 and the discharge resistor 62.

A time limit device 157 having a magnetizing coil 162 and a neutralizing coil 158 and a closed circuit coil 158', is interconnected with the source of direct current. The magnetizing coil is energized from conductor 160 through conductor 161, magnetizing coil 162, conductor 163, contact members 164 of field switch 247 and conductor 165 to the conductor 150. The magnetizing coil effects immediate closure of the contact members 166. Closure of the contact members 166 establishes a circuit from conductor 150 through contact members 166, actuating coil 167 of the control relay 267, conductor 159, and contact members 155 on the main line switch 2 to the energized conductor 160.

Operation of the control relay 267 closes the contact members 171 to energize the direct current coil 12 of the electromagnet 91. The operation of this relay 267 also closes the contact members 169 and 170, thereby energizing the transformer 66 and the impulse transformer 172. The transformer 66 energizes the cathode 20 of the electric discharge device 21 and, by a suitable conductor 185, connects the cathode to the potentiometer 184 to thus control the cathode potential with reference to the grid and the anode potential. In the modification shown in Fig. 4, the members 10 of magnetic material are connected to rotate with the rotor and are adapted to coact with the electromagnet 91 and thus produce a voltage wave in the coil 17. The coil 17 is connected to the primary winding 178 of an impulse transformer 176. The secondary winding 177 of the impulse transformer 176 is connected across a resistor 179 and a secondary winding 174 of the impulse transformer 172 is connected across a resistor 175. The grid 19 is connected to the resistors 175 and 179 in the manner shown and the selection of the electrical constants is such that the discharge device will be caused to breakdown only when the impulses from the impulse transformer 172 and 176 are in phase.

The discharge device 21 will, however, not become conducting even though these impulses be in phase as long as the time limit device 280 has not completed its cycle of operation. When the contact members 155 close by the operation of the main switch 2, a circuit is established from a conductor 150 through actuating coil 180 of time limit device 280 and contact members 155 to the conductor 160. This time limit device 280 has a time constant, determined in the particular installation shown by a dashpot 282, such that the motor will attain its balancing speed before contact members 181 are closed. It is thus apparent that regardless of the biasing effect on the grid 19 caused by the two impulse transformers 172 and 176 that no transfer will take place prior to an operation of the relay 246.

Closure of the contact members 181 energizes the actuating coil 183 of the relay 246 which thereupon closes the contact members 189, and since contact members 168 are, at this stage of operation, closed, a conducting circuit is established from conductor 150 through contact members 168 and 189, actuating coil 190 of the field control relay 290, the electric discharge device 21, transformer 66, conductor 185 and a portion of the resistor 184 or potentiometer 184 to the conductor 160, the first time the impulses of the impulse transformers 172 and 176 are in phase after the closure of contact members 189.

The operation of the control relay 246 causes the closing of the contact members 186, 187 and a moment thereafter the opening of the contact members 188, whereas the operation of the field control relay 290 causes the closing of the contact members 191 and 195. The closing of the contact members 195 effects the energization of the field winding 22 with direct current whereas the closing of the contact members 191 establishes an energizing circuit for the main field switch 247. The circuit for the main field switch may be traced from conductor 150, through contact members 191 of field relay 290 and actuating coil 192 of field switch 247 to the energized conductor 159. Operation of the field contactor or switch 247 closes the contact members 194 and a moment thereafter opens the contact members 63 to open the discharge circuit for the field winding. The operation of the main field switch 247 establishes its own holding circuit through contact members 193 and also opens contact members 164 which are in the circuit of the magnetizing coil 162 of the time limit device 157.

The deenergization of the magnetizing coil 162 caused the opening of the contact members 166 with the result that the actuating coil 167 of control relay 267 is deenergized and the impulse transformers are disconnected from the source of energization by the opening of the contact members 169, 170 and 171.

We are, of course, aware that others skilled in the art, particularly after having had the benefit of the teachings of our invention, may devise other circuit diagrams for accomplishing the novel results hereinbefore specified and recited in the appended claims, but we wish to be limited only by the pertinent prior art and the scope of the appended claims.

We claim as our invention:

1. In a system of control for starting a synchronous motor having an armature winding and a field winding, means for producing a rotating field in the armature winding to start the motor as an induction motor, timing means operable after a predetermined interval of time, transfer means, energized by said timing means, adapted to energize the field winding with direct current, and means for so selecting the instant of operation of said transfer means after energization of the transfer means by said timing means to effect the energization of the field winding with direct current at such an instant to provide substantially maximum pull-in torque for the motor at the moment of transfer from induction motor operation to synchronous motor operation.

2. A starting control system for a synchronous motor, in combination, a synchronous motor having a stator provided with an armature winding, a rotor provided with a field winding and a starting winding, a source of alternating current, means adapted to connect the armature winding to the source of alternating current to start the motor as an induction motor, a source of direct current, a field switch adapted to connect the field winding to the source of direct current, an electric discharge device adapted, when discharged, to cause the operation of said field switch, an impulse generator, and impulse means producing voltage impulses having a frequency equal to the frequency of the current supplied to the armature by said source of alternating current both acting jointly on said electronic discharge means to cause the same to break down or discharge when the field winding has a selected position to the phases of the rotating field in the armature, and means operable after the lapse of a predetermined interval of time adapted to initiate the controlling effect of said impulse generator and said impulse means on the electric discharge device.

3. In a system of control for starting a synchronous motor, in combination, an impulse generator, mounted in a selected relation with reference to the field windings of the motor, adapted to generate impulses of electric energy which impulses will thus indicate each time the field winding holds a given position in space, impulse means energized from the source of supply of alternating current whereby impulses are produced of a frequency equal to the frequency of the supply, control means responsive to the combined impulses of the impulse generator and the impulse means adapted to energize the field winding with direct current, and means operable after the lapse of a selected interval of time adapted to initiate the operation of said control means.

4. In a system of control for starting a synchronous motor having an armature winding, or stator, and a field winding, or rotor, a source of alternating current, means adapted to connect the source of alternating current to the armature winding to produce a rotating field in said armature winding, means, coupled to the field winding adapted to produce a positive voltage wave each time the field winding holds a given position with reference to the armature winding, means interconnected with the source of alternating current adapted to produce a positive voltage wave each time a given point on the rotating field in the armature has a selected position with reference to the stator, an electric discharge device adapted to become conducting when said positive voltage waves are in phase, time limit means adapted to delay the operation of the two means producing the positive voltage waves for a selected interval of time after the operation of the means for connecting the armature winding to the source of alternating current, and means adapted to energize the field winding with direct current in response to the operation of the breakdown of the electric discharge device.

5. A starting control system for a synchronous motor, in combination, a synchronous motor having a stator provided with an armature winding, a rotor provided with a field winding and a starting winding, a source of alternating current, means adapted to connect the armature winding to the source of alternating current to start the motor as an induction motor, a source of direct current, a field switch adapted to connect the field winding to the source of direct current, an electric discharge device adapted, when discharging, to cause the operation of said field switch, an impulse generator, and impulse means producing voltage impulses having a frequency equal to the frequency of the current supplied to the armature by said source of alternating current both acting jointly on said electronic discharge means to cause the same to break down or discharge when the field winding has a selected position to the phases of the rotating field in the armature winding.

6. In a system of control for starting a synchronous motor, in combination, electrical impulse producing means including an element mounted in a selected relationship with reference to the field windings of the motor, adapted to cause electric impulses which impulses will thus indicate each time the field winding holds a given position in space, impulse producing means energized from the source of supply of alternating current whereby impulses are produced having a frequency equal to the frequency of the source of alternating current supply, and means operable after the lapse of a selected interval of time adapted to initiate the operation of said control means.

7. A starting control system for a synchronous motor, in combination, a synchronous motor having a stator provided with an armature winding, a rotor provided with a field winding and a starting winding, a source of alternating current, means adapted to connect the armature winding to the source of alternating current to start the motor as an induction motor, a source of direct current, a high-speed field switch adapted to connect the field winding to the source of direct current, an electric discharge device adapted, when discharged, to cause the operation of said field switch, an impulse generator and an electric impulse producing means producing voltage impulses having frequencies equal to the frequency of the current supplied to the armature by said source of alternating current and proportional to the slip of the rotor, respectively, both acting jointly on said electric discharge means to cause the same to break down or discharge when the field winding has a selected position to the phases of the rotating field in the armature winding, and means adapted to connect said field winding to said source of direct current and to deenergize said high-speed field switch and electric discharge device.

8. A starting control system for a synchronous motor, in combination, a synchronous motor having a stator provided with an armature winding, a rotor provided with a field winding and a starting winding, a source of alternating current, means adapted to connect the armature winding to the source of alternating current to start the motor as an induction motor, a source of direct current, a high-speed field switch adapted to connect the field winding to the source of direct current, an electric discharge device adapted, when discharged, to cause the operation of said field switch, an impulse generator and an electric impulse producing means producing voltage impulses having frequencies equal to the frequency of the current supplied to the armature by said source of alternating current and proportional to the slip of the rotor, respectively, both acting jointly on said electric discharge means to cause the same to break down or discharge when the field winding has a selected position to the phases of the rotating field in the armature winding, means adapted to connect said field winding to said source of direct current and to deenergize said high-speed field switch and electric discharge device, and means operable after the lapse of a predetermined interval of time adapted to initiate the controlling effect of said impulse generator and said electric impulse producing means on the discharge device.

9. In a system of control for starting a synchronous motor, in combination, an impulse generator, mounted in a selected relation with reference to the field windings of the motor, adapted to generate impulses of electric energy which impulses will thus indicate each time the field winding of the motor holds a given position in space, electric impulse producing means energized from the source of supply of alternating current whereby impulses are produced of a frequency equal to the frequency of the alternating-current supply, high-speed control means responsive to the combined impulses of the impulse generator and the electric impulse producing means adapted to energize the field winding with direct current within an interval of time that is practically negligible with reference to the starting period of a synchronous motor, and means operable after the lapse of a selected interval of time adapted to initiate the operation of said control means.

10. A system of control for a synchronous motor, in combination, a synchronous motor having an armature winding and a field winding mounted on pole pieces, a source of alternating current, a source of direct current, switching means adapted to connect the armature winding to the source of alternating current to start the motor as an induction motor, switching means adapted to connect said field winding to said source of direct current, electronic control means including means operable to produce an electrical effect each time the instantaneous voltage of the source of alternating current being supplied to the armature winding passes through a given value, means operable to produce an electrical effect each time a given point on the pole pieces holds a given position in space, and means, responsive to the joint electrical effects of the last two means mentioned, adapted to effect the operation of the switching means for connecting the field winding to the source of direct current, and means, operable after the lapse of a definite interval of time after the operation of the switching means connecting the armature winding to the source of alternating current, adapted to initiate the operation of said control means.

11. In a system of control, in combination, a source of alternating current, a dynamo-electric machine adapted to be connected to said source of alternating current to be operated thereby, said dynamo-electric machine having a rotor and windings on the rotor, circuit connections for the rotor windings, control means including a device operable to produce an electrical effect each time the instantaneous voltage of the source of alternating current being supplied to the dynamo-electric machine passes through a given value, a device operable to produce an electrical effect each time a given point on the rotor holds a given position in space, and means, responsive to joint electrical effects of the devices mentioned, adapted to control the circuit arrangement of the windings on the rotor with the said circuit connections, and time limit means adapted to delay the operation of said control means for a selected interval of time after the dynamo-electric machine is energized with alternating current.

12. In an electric system comprising a synchronous motor having two elements, namely, a stator and a rotor, one of the elements being an armature and the other element being a field winding, means for connecting said armature to a source of alternating current, means for connecting said field winding to a source of direct current, means comprising a gas-containing grid-controlled tube for controlling the second-named connecting means, the tube being normally non-conducting, a transformer for controlling the tube, the transformer having a primary winding and a secondary winding, means for connecting the secondary winding to the grid of the tube, and means controlled by one of the elements and connected to the primary winding for rendering the tube conducting.

13. In an electric system comprising a synchronous motor having two elements, namely, a stator and a rotor, one of the elements being an armature and the other element being a field winding, means for connecting said armature to a source of alternating current, means for connecting said field winding to a source of direct current, means comprising a gas-containing grid-controlled tube for controlling the second-named connecting means, the tube being normally non-conducting, a transformer for controlling the tube, the transformer having a primary winding and a secondary winding, means for connecting the secondary winding to the grid of the tube, and means controlled by the rotating part of the motor and connected to the primary winding for rendering the tube conducting.

14. In an electric system comprising a synchronous motor having two elements, namely, a stator and a rotor, one of the elements being an armature and the other element being a field winding, means for connecting said armature to a source of alternating current, means for connecting said field winding to a source of direct current, means comprising a gas-containing grid-controlled tube for controlling the second-named connecting means, the tube being normally non-conducting, a transformer for controlling the tube, the transformer having a primary winding and a secondary winding, means for connecting the secondary winding to the grid of the tube, and means in phase with the voltage of the source and connected to the primary winding for rendering the tube conducting.

15. In combination, a discharge device having a plurality of principal electrodes and a control electrode and a gaseous medium, means for impressing a potential between said pricipal electrodes, means for impressing between said control electrode and one of said principal electrodes a potential of substantially peaked wave form that is of such magnitude that said device is non-conductive when subjected to it alone and means for super-imposing another potential of substantially peaked wave form on said second-named potential of such magnitude that the sum of said potentials is sufficient to render said discharge device conductive.

16. In combination, a discharge device having a plurality of principal electrodes and a control electrode and a gaseous medium, means for impressing a potential between said principal electrodes, means for impressing between said control electrode and one of said principal electrodes a potential of substantially peaked wave form that is of such magnitude that said device is non-conductive when subjected to it alone and means for superimposing another potential of substantially peaked wave form on said second-named potential of such magnitude that the sum of said potentials is sufficient to render said discharge device conductive, the last said means including means for broadening the wave shape of said last-named potential.

17. In combination, a discharge device having a plurality of principal electrodes and a control electrode and a gaseous medium in the discharge device, means for impressing a potential between said principal electrodes, means for impressing between said control electrode and one of said principal electrodes a potential of substantially peaked wave form that is of such magnitude that said device is non-conducting when subjected to it alone and means for superimposing another potential of substantially peaked wave form on said second-named potential of such magnitude that the sum of said potentials is sufficient to render said discharge device conducting, the last said means including means for altering the wave shape of said last-named potential, and means for causing the two potentials impressed between the control electrode and one of the principal electrodes to aperiodically coincide.

CHARLES C. SHUTT.
JOHN W. DAWSON.